United States Patent
Takada et al.

(10) Patent No.: US 10,787,072 B2
(45) Date of Patent: Sep. 29, 2020

(54) CONTROL SYSTEM FOR VEHICLE

(71) Applicant: TOYOTA JIDOSHA KABUSHIKI KAISHA, Toyota-shi, Aichi-ken (JP)

(72) Inventors: Norifumi Takada, Mishima (JP); Seiji Kuwahara, Sunto-gun (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 7 days.

(21) Appl. No.: 16/371,665

(22) Filed: Apr. 1, 2019

(65) Prior Publication Data

US 2019/0299766 A1  Oct. 3, 2019

(30) Foreign Application Priority Data

Apr. 2, 2018  (JP) .................. 2018-071157

(51) Int. Cl.
*B60K 6/365* (2007.10)
*B60K 6/547* (2007.10)
(Continued)

(52) U.S. Cl.
CPC ............. *B60K 6/365* (2013.01); *B60K 6/448* (2013.01); *B60K 6/52* (2013.01); *B60K 6/547* (2013.01); *B60K 17/354* (2013.01); *B60K 23/08* (2013.01); *B60W 10/02* (2013.01); *B60W 10/08* (2013.01); *B60W 20/20* (2013.01); *B60W 20/40* (2013.01); *B60Y 2400/421* (2013.01); *F16H 2200/2094* (2013.01); *F16H 2200/2097* (2013.01)

(58) Field of Classification Search
CPC ...... B60K 17/354; B60K 17/356; B60K 1/00; B60K 2001/001; B60K 2023/0825; B60K 23/08; B60K 5/02; B60K 6/365; B60K 6/448; B60K 6/46; B60K 6/52; B60K 6/547; B60W 10/02; B60W 10/06; B60W 10/08; B60W 10/115; B60W 20/20; B60W 20/30; B60W 2510/083; B60W 2540/06; B60W 30/192; B60Y 2200/92; B60Y 2400/421; B60Y 2400/73; F16H 2200/0021; F16H 2200/0034; F16H 2200/2005; F16H 2200/2035; F16H 2200/2094; F16H 2200/2097; F16H 3/54

See application file for complete search history.

(56) References Cited

U.S. PATENT DOCUMENTS

2017/0368942 A1* 12/2017 Endo .................... B60W 20/30
2018/0141464 A1*  5/2018 Tsukizaki ............. B60W 20/13

FOREIGN PATENT DOCUMENTS

JP  2009-269429 A  11/2009

* cited by examiner

Primary Examiner — Jacob S. Scott
(74) Attorney, Agent, or Firm — Sughrue Mion, PLLC

(57) ABSTRACT

A vehicular control system for reducing shocks by inhibiting switching operation of a dog clutch when drive force cannot be assisted by an engine. A controller determines that an increase in the drive force by the engine is restricted. In a case that an increase in the drive force is not restricted when launching the vehicle, the controller establishes a first gear stage in the transmission to launch the vehicle, and shift to the second gear stage upon satisfaction of a predetermined condition during propulsion while increasing the drive force. In a case that an increase in the drive force is restricted when launching the vehicle, the controller establishes a second gear stage in the transmission to launch the vehicle.

9 Claims, 11 Drawing Sheets

(51) Int. Cl.
  *B60K 17/354*    (2006.01)
  *B60K 23/08*     (2006.01)
  *B60W 10/02*     (2006.01)
  *B60W 20/20*     (2016.01)
  *B60K 6/448*     (2007.10)
  *B60K 6/52*      (2007.10)
  *B60W 20/40*     (2016.01)
  *B60W 10/08*     (2006.01)

CONTROL SYSTEM FOR VEHICLE

CROSS REFERENCE TO RELATED APPLICATIONS

The present disclosure claims the benefit of Japanese Patent Application No. 2018-071157 filed on Apr. 2, 2018 with the Japanese Patent Office, the disclosure of which are incorporated herein by reference in its entirety.

BACKGROUND

Field of the Disclosure

Embodiments of the present disclosure relate to the art of a control system for a vehicle having two prime movers and a transmission, and more particularly, to a control system for controlling a gear stage of the transmission.

Discussion of the Related Art

JP-A-2009-269429 describes a hybrid vehicle in which a prime mover includes an internal combustion engine and a motor-generator. In the hybrid vehicle taught by JP-A-2009-269429, a motor-generator is connected to an output side of the engine through a clutch, and an automatic transmission is connected to an output side of the motor-generator. A gear stage of the automatic transmission is shifted among a plurality of stages by manipulating clutches. A drive torque generated by the prime mover is delivered to drive wheels from the automatic transmission via a differential gear unit. However, an output power of the engine may be restricted depending on the conditions of the engine itself and auxiliaries of the engine. In that case, an assist torque may be generated by the motor-generator. According to the teachings of JP-A-2009-269429, when warming-up an exhaust gas purifying catalyst, the highest gear stage is selected and an output power of the engine is reduced to a minimum power. In this situation, shortage of the drive force (or a torque required to propel the vehicle) resulting from reducing the output power of the engine is compensated by the motor-generator.

That is, JP-A-2009-269429 describes a control for launching the hybrid vehicle that has been stopping for a long period of time. Therefore, when the warming-up is completed, a vehicle speed is increased, or a required drive force is increased after starting the engine, it is necessary to change a speed ratio of the automatic transmission. As the conventional automatic transmissions, the gear stage of the automatic transmission described in JP-A-2009-269429 is established by manipulating a plurality of frictional engagement devices. Therefore, although the torque drops temporarily, transmission of the drive force to propel the hybrid vehicle taught by JP-A-2009-269429 will not be interrupted even when shifting the gear stage of the automatic transmission.

A transmission and a power unit may be downsized by employing a dog clutch. The dog clutch may be engaged and disengaged completely, however, the dog clutch may not be engaged partially while causing a slip. That is, given that the dog clutches are employed in the transmission of a vehicle, torque transmission may be interrupted temporarily when shifting a gear stage of the transmission in accordance with a change in an operating condition of the vehicle. Consequently, acceleration and a braking force may be reduced temporarily thereby changing a drive force abruptly.

SUMMARY

Aspects of embodiments of the present disclosure have been conceived noting the foregoing technical problems, and it is therefore an object of the present disclosure to provide a control system for a vehicle configured to prevent a change in a drive force resulting from a shifting operation of a transmission for a second prime mover, when a drive force cannot be increased by a first prime mover.

The control system according to the exemplary embodiment of the present disclosure is applied to a vehicle comprising: a transmission that can establish at least a first gear stage and a second gear stage; a first prime mover that applies torque to drive wheels through the transmission; and a second prime mover that applies torque to the drive wheels or another drive wheels. The transmission includes a dog clutch that is engaged when establishing the first gear stage and when establishing the second gear stage to transmit the torque through the transmission, and that is disengaged temporarily thereby interrupting torque transmission through the transmission when shifting between the first gear stage and the second gear stage. In order to achieve the above-explained objective, the control system is provided with a controller that controls the transmission. The controller is configured to: determine that an increase in drive force of the drive wheels or said another drive wheels by the torque of the second prime mover is restricted; establish the first gear stage in the transmission to launch the vehicle in a case that an increase in the drive force is not restricted when launching the vehicle, and shift to the second gear stage upon satisfaction of a predetermined condition during propulsion of the vehicle while increasing the drive force from the drive force of when launching the vehicle; and establish the second gear stage in the transmission to launch the vehicle in a case that an increase in the drive force is restricted when launching the vehicle.

In a non-limiting embodiment, the first prime mover may be an electric motor and the second prime mover may be an internal combustion engine. The vehicle may be a hybrid vehicle, in which an operating mode is selected from a first mode for propelling the vehicle by a torque of the electric motor, and a second mode for propelling the vehicle by a torque of the internal combustion engine.

In a non-limiting embodiment, a clutch may be disposed between the second prime mover and the drive wheels or said another drive wheels to selectively interrupt torque transmission therebetween. The controller may be further configured to determine that an increase in drive force of the drive wheels or said another drive wheels by the torque of the second prime mover is restricted upon satisfaction of a condition to propel the vehicle while disengaging the clutch to interrupt torque transmission through the clutch.

In a non-limiting embodiment, the condition to propel the vehicle while disengaging the clutch may include a condition to propel the vehicle in the first mode.

In a non-limiting embodiment, the internal combustion engine may include an exhaust gas purifying catalyst. The controller may be further configured to determine that an increase in drive force of the drive wheels or said another drive wheels by the torque of the second prime mover is restricted upon satisfaction of a condition to warm-up the exhaust gas purifying catalyst.

In a non-limiting embodiment, the predetermined condition may include a fact that at least any one of a vehicle speed and a required drive force to propel the vehicle exceeds a reference value.

In a non-limiting embodiment, the drive wheels may be front wheels, and said another drive wheels may be rear wheels, and the second prime mover may apply the torque to the rear wheels. A speed ratio of the first gear stage may be smaller than a speed ratio of the second gear stage, and the predetermined condition may include a condition to propel the vehicle in a four-wheel mode in which the vehicle is propelled by driving both of the front wheels and the rear wheels.

In a non-limiting embodiment, the controller may be further configured to start the internal combustion engine and shift the gear stage of the transmission simultaneously when both of a condition to start the internal combustion engine and a condition to shift the gear stage of the transmission are satisfied.

According to the embodiment of the present disclosure, the vehicle may be propelled by the torque of at least any one of the first prime mover and the second prime mover. In the case that an increase in the drive force by the second prime mover is not restricted, the controller establishes the first gear stage in the transmission to launch the vehicle, and propels the vehicle by delivering the torque of the first prime mover to the drive wheel. Then, when the predetermined condition is satisfied, the gear stage of the transmission is shifted to the second gear stage. Specifically, the shifting operation of the transmission is executed by temporarily disengaging the dog clutch engaged in such a manner as to establish the first gear stage, and thereafter engaging the dog clutch in such a manner as to establish the second gear stage. Consequently, transmission of the torque of the first prime mover is temporarily interrupted during the shifting operation of the transmission. According to the exemplary embodiment of the present disclosure, however, a shortage of the drive force resulting from such temporal interruption of torque transmission may be compensated by the second prime mover. For this reason, the drive force will not be changed abruptly and the occurrence of shock may be prevented. By contrast, in the case that an increase in the drive force by the second prime mover is restricted, the controller establishes the second gear stage in the transmission to launch the vehicle. In this case, therefore, a shifting operation of the transmission will not be caused after launching the vehicle even if the predetermined condition is satisfied. That is, an engagement state of the dog clutch will not be changed, and the temporal interruption of torque transmission will not be caused. For this reason, the drive force will not be reduced temporarily and the occurrence of shock may be prevented.

BRIEF DESCRIPTION OF THE DRAWINGS

According Features, aspects, and advantages of exemplary embodiments of the present disclosure will become better understood with reference to the following description and accompanying drawings, which should not limit the invention in any way.

DETAILED DESCRIPTION OF THE PREFERRED EMBODIMENT(S)

Embodiments of the present disclosure will now be explained with reference to the accompanying drawings. Note that the embodiments shown below are merely examples of the present disclosure, and do not limit a scope of the present disclosure.

Figure 1:
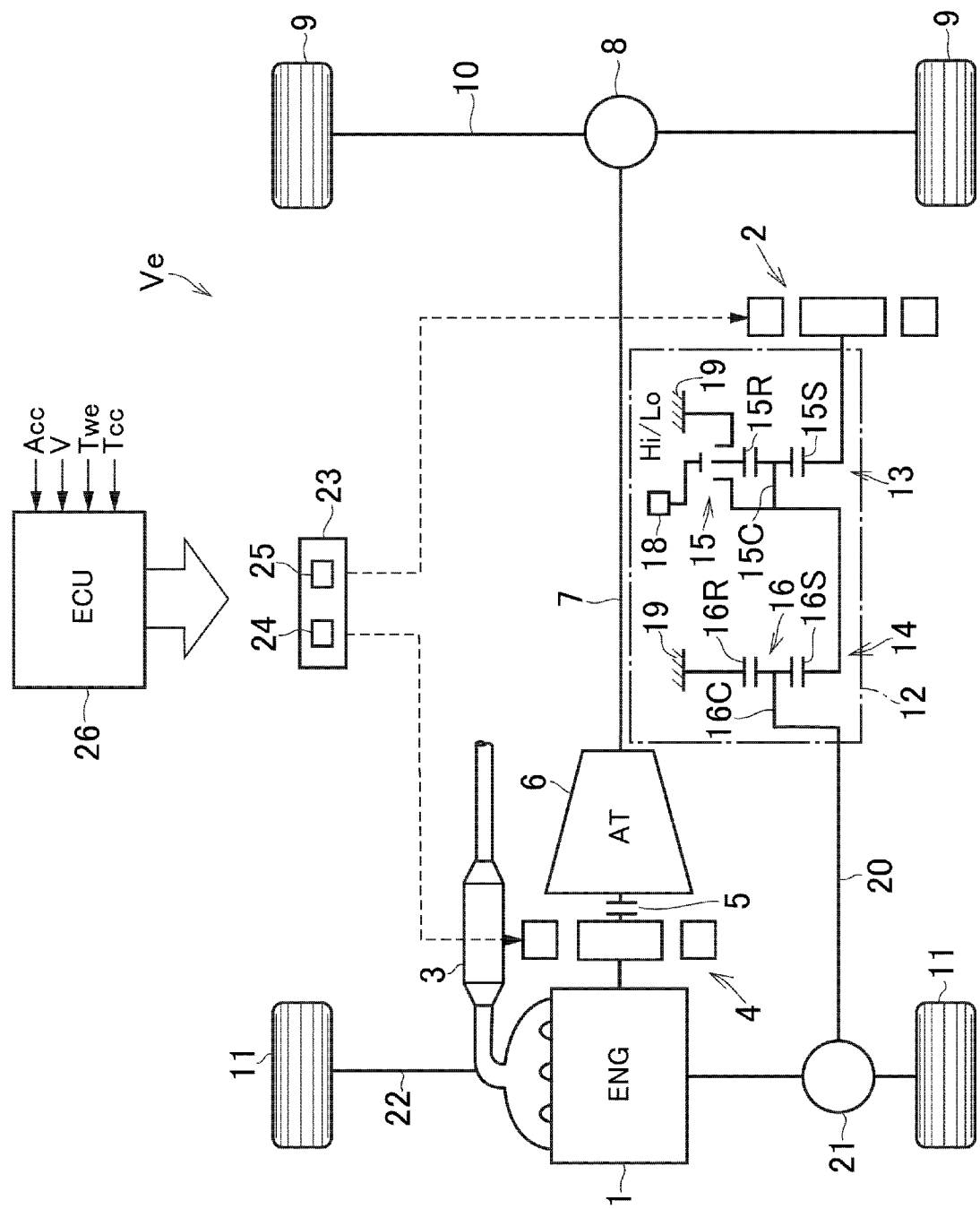
FIG. 1 is a schematic illustration showing a powertrain of a vehicle to which the control system according to the embodiment of the present disclosure is applied.

Turning now to FIG. 1, there is shown a structure of a vehicle Ve to which the control system according to the exemplary embodiment of the present disclosure is applied. Specifically, the vehicle Ve shown in FIG. 1 is a four-wheel drive layout (i.e., 4WD or AWD) vehicle in which a prime mover includes an engine 1 and a motor (MG2) 2. The engine 1 as a second prime mover of the embodiment is an internal combustion engine that generates power by burning air/fuel mixture, and arranged in a front section of the vehicle Ve toward a rear side of the vehicle Ve. An exhaust gas purifying catalyst (as will be called the "catalytic converter" hereinafter) 3 is arranged in an exhaust system of the engine 1. The catalytic converter 3 is adapted to reduce concentration of exhaust gas of the engine 1 by oxidizing HC (hydrocarbon) and CO (carbon monoxide) contained in the exhaust gas, or by reducing nitrogen oxide contained in the exhaust gas. To this end, a temperature of the catalytic converter 3 is required to be raised to a predetermined activation temperature, and an upper limit value of the temperature of the catalytic converter 3 is set to limit thermal damage on the catalytic converter 3.

A generator (MG1) 4 such as a permanent magnet type synchronous motor is connected to an output shaft of the engine 1 so that the generator 4 is driven by the engine 1 to generate electricity. The generator 4 may also be driven to generate electricity by an inertial force of the vehicle Ve during propulsion, that is, to regenerate energy. The generator 4 may also be operated as a motor to crank the engine 1 and to generate a torque for propelling the vehicle Ve. Optionally, a damper device (not shown) may be arranged between the engine 1 and the generator 4.

An automatic transmission (AT) 6 is connected to an output side of the engine 1 through the generator 4 and a starting clutch 5. A gear stage of the automatic transmission 6 is shifted among a plurality of stages by engaging and disengaging a plurality of frictional engagement devices to alter a power transmission route as a gear train in the automatic transmission 6. The automatic transmission 6 is also connected to a rear differential gear unit 8 through a rear propeller shaft 7, and the rear differential gear unit 8 is connected to each rear wheel 9 as another drive wheel of the embodiment through a driveshaft 10.

The starting clutch 5 selectively connects and disconnects the engine 1 to/from the pair of rear wheels 9, and for example, a dry type or wet type friction clutch may be adopted as the starting clutch 5. The automatic transmission 6 is brought into a neutral stage by disengaging a predetermined frictional engagement device for establishing a predetermined gear stage. Therefore, torque transmission between the engine 1 and the rear wheels 9 may also be interrupted by disengaging the predetermined frictional engagement device of the automatic transmission 6, and therefore the starting clutch 5 may be omitted. Accordingly, the starting clutch 5 or the predetermined frictional engagement device of the automatic transmission 6 serves as a clutch of the exemplary embodiment.

In the vehicle Ve shown in FIG. 1, front wheels 11 are driven by the motor 2 as a first prime mover of the exemplary embodiment. For example, a permanent magnet type synchronous motor may also be adopted as the motor 2. Specifically, the motor 2 is operated as a motor to drive the front wheels 11 by supplying electricity thereto. The motor 2 may also be operated as a generator to generate electricity when rotated by a torque delivered from the front wheels 11.

For example, the motor 2 is connected to a transmission 12 comprising a speed changing section 13 and a speed reducing section 14. Specifically, the speed changing section 13 includes a single-pinion planetary gear unit 15 adapted to perform a differential action among: a sun gear 15S; a ring gear 15R arranged concentrically with the sun gear 15S; and a carrier 15C rotatably supporting pinion gears interposed between the sun gear 15S and the ring gear 15R. Likewise, the speed reducing section 14 includes a single-pinion planetary gear unit 16 adapted to perform a differential action among: a sun gear 16S; a ring gear 16R arranged concentrically with the sun gear 16S; and a carrier 16C rotatably supporting pinion gears interposed between the sun gear 16S and the ring gear 16R.

In the speed changing section 13, the sun gear 15S is connected to the motor 2 to serve as an input element, and the carrier 15C is connected to the sun gear 16S of the speed reducing section 14 to serve as an output element. That is, the sun gear 16S serves as an input element of the speed reducing section 14. The ring gear 15R of the speed changing section 13 is selectively halted to serve as a reaction element and connected to the carrier 15C by manipulating the dog clutch 17.

Figure 2:
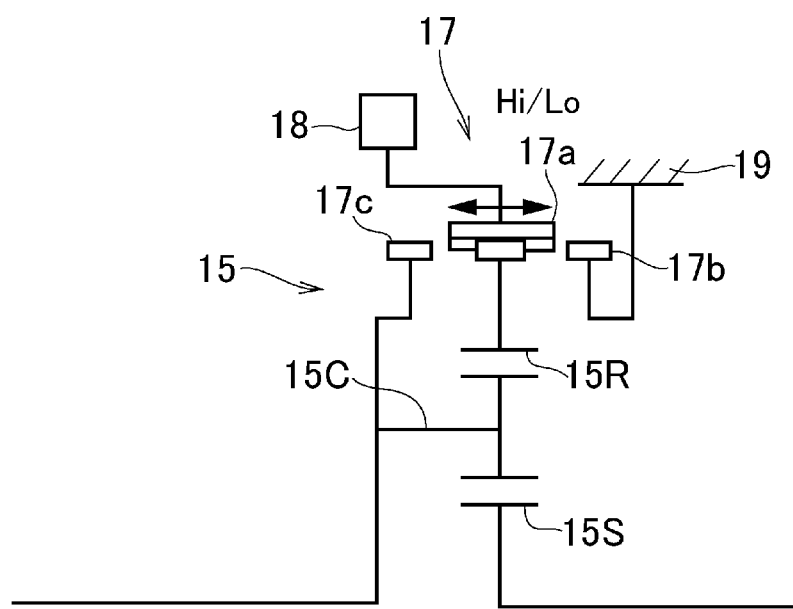
FIG. 2 is a skeleton diagram showing a speed change section of a transmission.

One example of a structure of the dog clutch 17 is shown in FIG. 2. In the dog clutch 17, a shift sleeve 17a is splined onto the ring gear 15R. That is, the shift sleeve 17a is rotated together with the ring gear 15R, and reciprocated in an axial direction by an actuator 18. For example, the actuator 18 is connected to the shift sleeve 17a through a mechanism similar to a shift fork of a conventional manual transmission. A fixed sleeve 17b and a rotatable sleeve 17c are situated on both sides of the ring gear 15R in the axial direction, and spline ridges of same diameter as those of the ring gear 15R are formed on outer surfaces of the fixed sleeve 17b and the rotatable sleeve 17c. Specifically, the fixed sleeve 17b is fixed to a stationary member 19 such as a casing, and the rotatable sleeve 17c is connected to the carrier 15C to be rotated integrally therewith. That is, the rotatable sleeve 17c is a part of the carrier 15C.

In the speed changing section 13, a predetermined gear stage is established by connecting the ring gear 15R selectively to the fixed sleeve 17b or the rotatable sleeve 17c through the shift sleeve 17a. Specifically, the ring gear 15R is connected to the stationary member 19 by shifting the shift sleeve 17a to the right side in FIG. 2 to engage the shift sleeve 17a with the fixed sleeve 17b. In this situation, the sun gear 15S is rotated by the motor 2 while halting the ring gear 15R so that the carrier 15C is rotated at a speed lower than a speed of the sun gear 15S. That is, a low speed stage (referred to as Lo in FIG. 2) is established. By contrast, the ring gear 15R is connected to the carrier 15C by shifting the shift sleeve 17a to the left side in FIG. 2 to engage the shift sleeve 17a with the rotatable sleeve 17c. In this situation, the planetary gear unit 15 is rotated entirely integrally so that the carrier 15C is rotated at a same speed and in a same direction as the sun gear 15S. That is, a high speed stage (referred to as Hi in FIG. 2) is established. Accordingly, any one of the low speed stage and the high speed stage corresponds to a first gear stage of the exemplary embodiment, and other one of the low speed stage and the high speed stage corresponds to a second gear stage of the exemplary embodiment.

In the planetary gear unit 16 of the speed reducing section 14, the ring gear 16R is connected to the stationary member 19 to serve as a reaction element that does not rotate, and the carrier 16C serves as an output element. That is, in the speed reducing section 14, the sun gear 16S as an input element is rotated while halting the ring gear 16R so that the carrier 16C is rotated at a speed lower than a speed of the sun gear 16S.

Turning back to FIG. 1, the carrier 16C as an output element is connected to a front differential gear unit 21 through a front propeller shaft 20 so that torque is distributed from the front differential gear unit 21 to each of the front wheels 11 through a driveshaft 22. Thus, the front wheels 11 are drive wheels.

The motor 2 and the generator 4 are electrically connected with a motor controller 23 including an electric storage device 24 such as a secondary battery and an inverter 25. Electricity generated by the motor 2 and the generator 4 may be accumulated in the electric storage device 24, and electricity accumulated in the electric storage device 24 may be supplied to the motor 2 and the generator 4.

The engine 1, the motor 2, the generator 4, the automatic transmission 6, the transmission 12, the starting clutch 5 etc. are controlled by an electronic control unit (to be abbreviated as the "ECU" hereinafter) 26 as a controller. Specifically, the engine 1 is started and stopped by the ECU 26, and an output torque of the engine 1 is also controlled by the ECU 26. The motor 2 and the generator 4 are selectively operated as a motor and a generator by the ECU 26, and also stopped by the ECU 26. Further, gear stages of automatic transmission 6 and the transmission 12 are controlled by the ECU 26, and the starting clutch 5 is engaged and disengaged by the ECU 26. The ECU 26 is composed mainly of a microcomputer, and is configured to execute a calculation based on input data as well as data installed in advance. Calculation results are transmitted from the ECU 26 in the form of command signal. To this end, for example, an accelerator opening Acc governed by a position of an accelerator pedal (not shown) corresponding to a drive demand, a vehicle speed V, an engine water temperature Twe, a temperature of the catalytic converter 3 and so on are sent to the ECU 26.

An operating mode of the vehicle Ve may be selected from an engine mode in which the vehicle Ve is propelled by an output torque of the engine 1, a motor mode in which the vehicle Ve is propelled by an output torque of the motor 2, and a four-wheel drive mode (to be abbreviated as the "4WD mode" hereinafter) in which the vehicle Ve is propelled by the output torques of both of the engine 1 and the motor 2. The motor mode may be selected from a series hybrid mode (to be abbreviated as the "series HV mode" hereinafter) in which the vehicle Ve is propelled while supplying electricity generated by the generator 4 to the motor 2, and an electric vehicle mode (to be abbreviated as the "EV mode" hereinafter) in which the vehicle Ve is propelled by operating the motor 2 by the electricity supplied from the electric storage device 24. Specifically, the operating mode of the vehicle Ve is selected based on a vehicle speed V, an accelerator opening Acc, a state of charge (to be abbreviated as the "SOC" hereinafter) level of the electric storage device 24 etc. A drive force generated by the motor 2 to propel the vehicle Ve is smaller than a drive force generated by the engine 1, and hence the motor mode is selected when the accelerator opening Acc is small, or when the vehicle speed V is low. Operation of the engine 1 may be restricted depending on a combustion efficiency, a purifying condition or the like. If the operation of the engine 1 is restricted by those factors, a drive torque of the engine 1 may not be increased sufficiently to achieve a required drive force. In this situation, the operating mode in which the vehicle Ve is propelled while delivering a torque of the engine 1 to the rear wheels 9 may not be selected, therefore, the vehicle Ve is powered by the motor 2 instead of the engine 1. The EV mode thus selected temporarily will be called the "temporal EV mode" hereinafter. Accordingly, the operating mode in which the vehicle Ve is propelled by the torque of the second motor corresponds to a first mode of the embodiment, and the operating mode in which the vehicle Ve is propelled while delivering a torque of the engine 1 to the rear wheels 9 corresponds to a second mode of the embodiment. Thus, one example of the vehicle Ve is a hybrid vehicle.

The control system according to the exemplary embodiment is configured to establish an appropriate gear stage of the transmission 12 in each operating mode. To this end, the ECU 26 executes the following controls.

Figure 3:
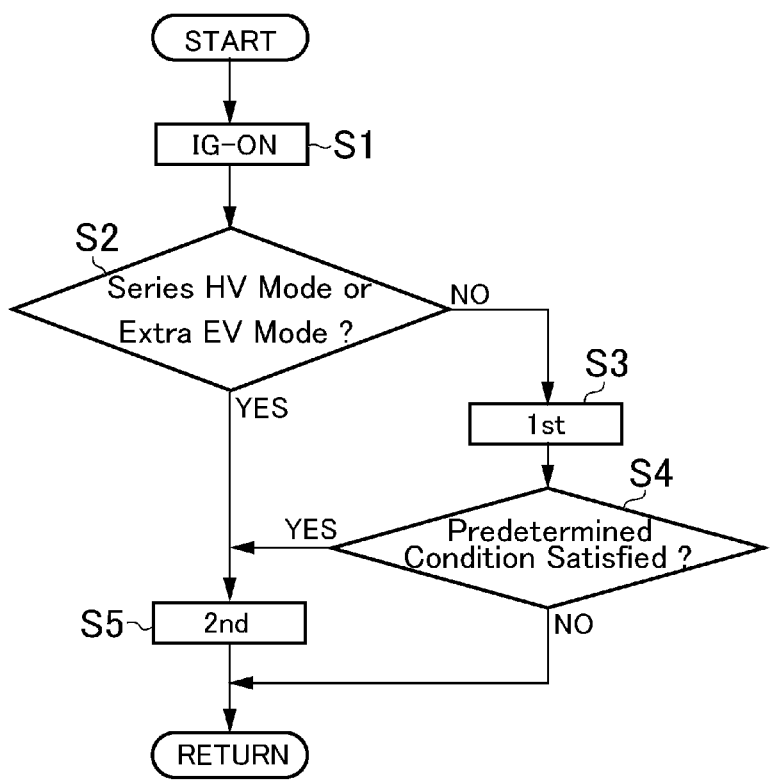
FIG. 3 is a flowchart showing one example of a routine executed by the control system.

Turning to FIG. 3, there is shown one example of a routine executed by the ECU 26 when launching the parked vehicle Ve. At step S1, a starting switch such as a main switch (neither of which are shown) is turned on by a driver so that a starting signal (IG-ON) is transmitted. Consequently, the computers mounted on the vehicle Ve are activated. Then, it is determined at step S2 whether the series HV mode or the temporal EV mode is selected. In the series HV mode, the generator 4 is driven by the engine 1 to generate electricity, the motor 2 is operated by the electricity generated by the generator 4, and an output torque of the motor 2 is delivered to the front wheels 11 to establish a drive force. Thus, in the series HV mode, an output torque of the engine 1 is not delivered to the rear wheels 9. That is, in the series HV mode, an increase in the drive force of the drive wheel or another drive wheel by an output torque of the engine 1 as the second prime mover is restricted. The temporal EV mode is selected when the output torque of the engine 1 is restricted, and in the temporal EV mode, the drive force is generated by the motor 2 instead of the engine 1. For example, the output torque of the engine 1 is restricted when an output power of the engine 1 is maintained to a predetermined power to warm-up the catalytic converter 3 to the activation temperature, or to warm-up the engine 1 itself. That is, in the temporal EV mode, an increase in the drive force of the drive wheel or another drive wheel by the output torque of the engine 1 is also restricted. In other words, at step S2, it is determined whether the drive force of the drive wheel or another drive wheel cannot be increased by an output torque of the second prime mover. In both of the series HV mode and the temporal EV mode, the starting clutch 5 is disengaged so as to disconnect the engine 1 to the rear wheels 9. That is, such determination at step S2 may be made based on a fact that a condition to launch the vehicle Ve while disengaging the starting clutch 5 is satisfied.

If the drive force can be increased by the engine 1 according to need so that the answer of step S2 is NO, the routine progresses to step S3 to establish the first gear stage in the transmission 12 to launch the vehicle Ve. In this case, the aforementioned low speed stage may be selected as the first gear stage. However, the high speed stage may also be selected as the first gear stage depending on a speed ratio of each of the low speed stage and the high speed stage, and a maximum output torque of the motor 2.

Then, it is determined at step S4 whether a predetermined condition is satisfied in the first gear stage established in the transmission 12. For example, the predetermined condition is satisfied when an accelerator opening Acc corresponding to a vehicle speed V and a required drive force reaches a reference value. When the vehicle speed V is increased, a speed of the motor 2 is increased and hence an available output torque of the motor 2 is reduced. In addition, an energy efficiency is also reduced. In order to avoid such disadvantages, it is preferable to reduce a speed ratio of the transmission 12 situated on the output side of the motor 2. To this end, therefore, the answer of step S4 will be YES when the vehicle speed V reaches the reference value.

At step S4, the predetermined condition is also satisfied when it is required to drive both pairs of the front wheels 11 and the rear wheels 9 to travel on a rough road or a muddy road, in other words, it is required to propel the vehicle Ve in the 4WD mode. In this case, the high speed stage is selected as the first gear stage, and also selected as a standard stage during normal propulsion. When traveling on a rough road or a muddy road, a large drive force of the front wheels 11 is required in the 4WD mode (or the AWD mode). In this case, it is preferable to select a gear stage in which a speed ratio is larger than a speed ratio in the first gear stage, therefore, the answer of step S4 will also be YES.

If the above-explained predetermined condition is satisfied so that the answer of step S4 is YES, the routine progresses to step S5 to establish the second gear stage in the transmission 12, and thereafter returns. For example, if the low speed stage has been selected as the first gear stage at step S3, the high speed stage is selected as the second gear stage at step S5. By contrast, if the high speed stage has been selected as the first gear stage at step S3, the low speed stage is selected as the second gear stage at step S5. In the case that the second gear stage is the high speed stage, the speed ratio of the transmission 12 is reduced from that in the first gear stage when the vehicle speed V is increased. In this case, therefore, a rotational speed of the motor 2 can be reduced. Otherwise, in the case that the second gear stage is the low speed stage, the drive force of the front wheels 11 can be increased to travel on the rough road easily.

If the above-explained predetermined condition is not satisfied so that the answer of step S4 is NO, the routine returns without carrying out any specific control. In this case, therefore, the first gear stage selected when launching the vehicle Ve is maintained.

If a transmission of the output torque of the engine 1 to the rear wheels 9 is restricted (or inhibited), in other words, if the drive force cannot be increased by the engine 1 so that the answer of step S2 is YES, the routine progresses to step S5 to establish the second gear stage in the transmission 12. In this case, a gear stage to be established upon satisfaction of a predetermined condition to realize a current condition or a predicted condition is selected as the second gear stage. For example, a gear stage to be established when the vehicle speed V is increased during propulsion by driving the rear wheels 9 by the engine 1 after launching the vehicle Ve is selected as the second gear stage. Thus, in the current condition or the predicted condition, the gear stage to be established upon satisfaction of a predetermined condition is selected as the second gear stage after launching the vehicle Ve.

Figure 4:
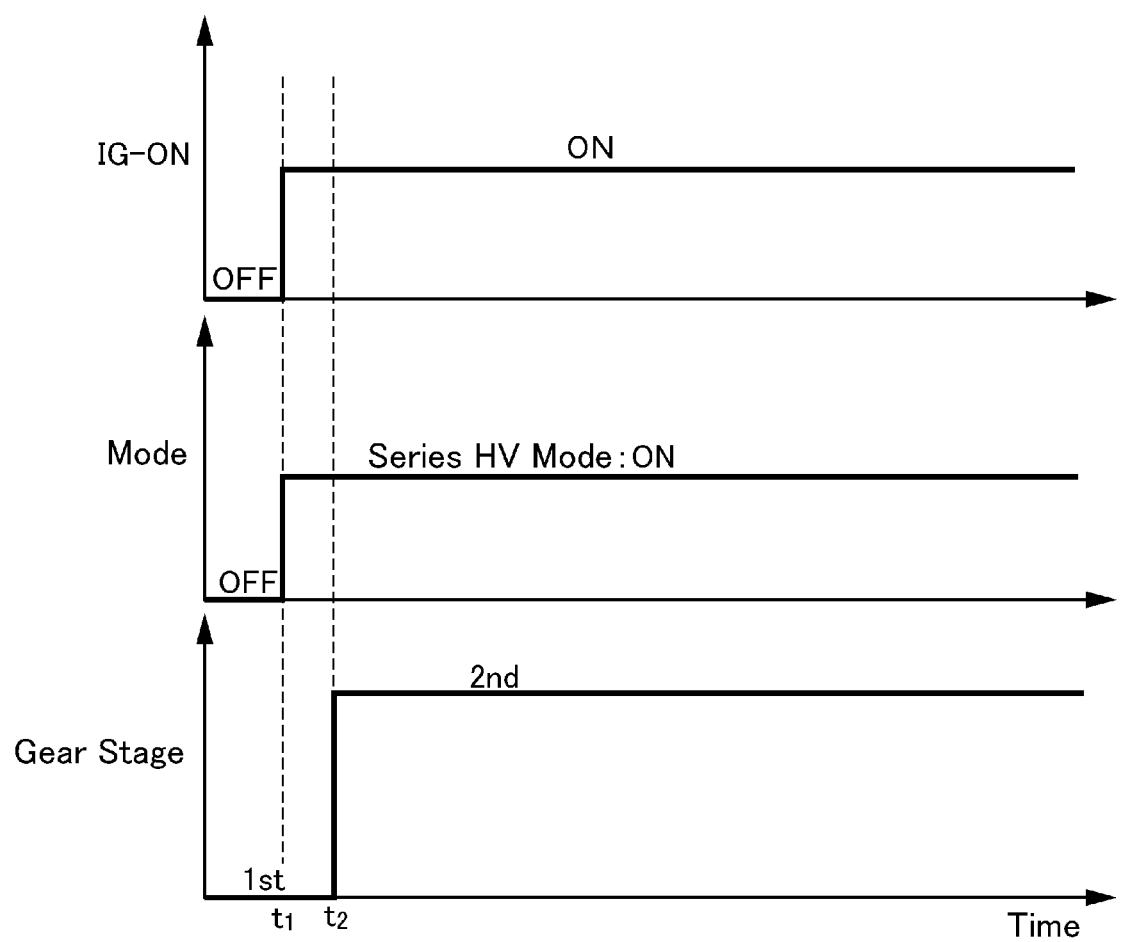
FIG. 4 is a time chart showing temporal changes in an IG-ON signal, an operating mode, and a gear stage of the transmission during execution of the routine shown in FIG. 3.

Turning to FIG. 4, there is shown a temporal change in the gear stage of the transmission 12 during execution of the routine shown in FIG. 3. Specifically, FIG. 4 shows an example of a case in which an operation to launch the vehicle Ve is executed, and at the same time, a determination to propel the vehicle Ve in the series HV mode is satisfied. At point t1, the starting signal IG-ON is transmitted, and a determination to propel the vehicle Ve in the series HV mode is satisfied substantially simultaneously. In this situation, therefore, the determination of a fact that an increase in the drive force by the engine 1 is restricted is satisfied. When or immediately after launching the vehicle Ve in the normal condition in which the output power of the engine 1 is not restricted, the first gear stage (1st) is established in the transmission 12. Therefore, the first gear stage is selected in the transmission 12 at point t1. However, since the determination to propel the vehicle Ve in the series HV mode has been satisfied (or a flag has been turned on), the gear stage of the transmission 12 is shifted from the first gear stage to the second gear stage (2nd) at point t2, and the second gear stage is maintained after point t2. That is, a shifting operation of the transmission 12 will not be caused after point t2.

According to the routine shown in FIG. 3, in the case of propelling the vehicle Ve by the drive force of the motor 2 without driving the rear wheels 9 by the engine 1, the second gear stage is established in the transmission 12 from the beginning of launching the vehicle Ve. In this case, therefore, a shifting operation of the transmission 12 will not be caused even if the above-explained predetermined condition is satisfied. Specifically, a shifting operation of the transmission 12 will not be caused even when the vehicle speed V is increased or when travelling on a rough road. As described, the shifting operation of the transmission 12 is executed by changing an engagement state of the dog clutch 17 from a state of establishing the current stage to a state of establishing another gear stage via a disengagement state in which a torque transmission is interrupted. That is, the torque transmission is temporarily interrupted during execution of the shifting operation of the transmission 12. However, in the case of propelling the vehicle Ve by the motor 2, the shifting operation of the transmission 12 will not be caused by executing the routine shown in FIG. 3. According to the exemplary embodiment of the present disclosure, therefore, a temporal interruption of the drive force may be prevented. In addition, a reduction in acceleration and an occurrence of shocks may also be prevented.

Figure 5:
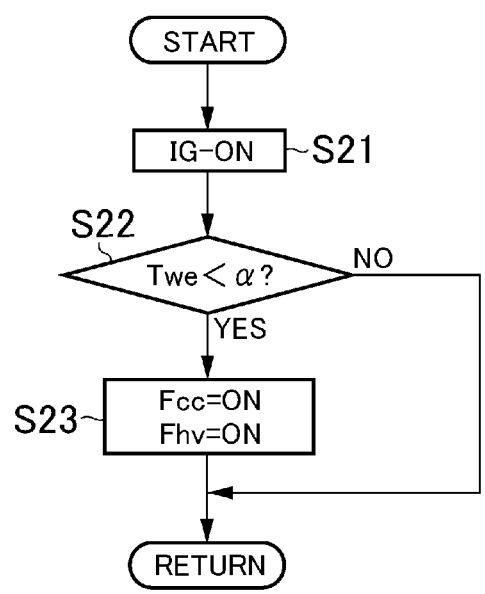
FIG. 5 is a flowchart showing one example of a routine for controlling a control flag.

The determination at step S2 may also be made based on a state of a control flag. FIG. 5 shows an example of a subroutine for turning on and off a catalyst warm-up flag Fcc and a series HV flag Fhv based on an engine water temperature Twe. At step S21, the starting switch is turned on so that the starting signal (IG-ON) is transmitted. Then, it is determined at step S22 whether the engine water temperature Twe is lower than a threshold level α. Specifically, the threshold level α is set to a lower limit temperature at which the air-fuel mixture is combusted stably and efficiently in the engine 1, and the threshold level α is set based on a result of an experimentation or simulation. For example, the threshold level α may be set to 40 degrees C. Here, such determination at step S22 may also be made by comparing a temperature of the catalytic converter 3 to a reference temperature together with comparing the engine water temperature Twe to the threshold level α, or instead of comparing the engine water temperature Twe to the threshold level α.

Given that an operating point of the engine 1 is set to a high torque side and a high speed side before the warm-up of the engine 1 and the catalytic converter 3 have been completed, the air/fuel mixture may not be combusted stably. Consequently, energy efficiency may be reduced and exhaust gas may be increased. In order to avoid such disadvantages, if the answer of step S22 is YES, the operating point of the engine 1 is maintained to a predetermined point. In other words, an output power of the engine 1 is maintained to a predetermined power. That is, an increase in the drive force by the output torque of the engine 1 is restricted in this situation. In order to indicate such situation in which the drive force cannot be increased by the output torque of the engine 1, if the answer of step S22 is YES, the routine progresses to step S23 to turn on the catalyst warm-up flag Fcc and the series HV flag Fhv.

Specifically, the catalyst warm-up flag Fcc is turned on to maintain the output power of the engine 1 to a power suitable to warm-up the catalytic converter 3. Therefore, if the catalyst warm-up flag Fcc is turned on, the vehicle Ve is propelled by the motor 2 instead of the engine 1 even if the vehicle Ve is in a condition (governed by the vehicle speed V and the accelerator opening Acc) to be basically propelled by driving the rear wheels 9 by the engine 1. That is, the vehicle Ve is propelled in the temporal EV mode in which the vehicle Ve is powered by the motor 2 instead of the engine 1. Accordingly, if the catalyst warm-up flag Fcc is turned on, the answer of step S2 of the routine shown in FIG. 3 will be YES.

Likewise, if the engine water temperature Twe is lower than the threshold level α, the output power of the engine 1 may not be increased greater than the predetermined power. In this case, the series mode is selected to drive the generator 4 to generate electricity by the engine 1 being operated to generate a constant power, and to operate the motor 2 to propel the vehicle Ve by supplying the electricity generated by the generator 4 to the motor 2. To this end, if the answer of step S22 is YES, the series HV flag Fhv is turned on. Consequently, the vehicle Ve is propelled in the series HV mode, and the answer of step S2 of the routine shown in FIG. 3 will be YES. Here, at step S22, it is also possible to turn on any one of the aforementioned flags. In this case, the determination at step S2 of the routine shown in FIG. 3 is made based only on one of the flags. By contrast, if the answer of step S22 is NO, the routine returns without executing any specific control. In this case, both of the catalyst warm-up flag Fcc and the series HV flag Fhv are turned off.

In the case that the aforementioned "predetermined condition" is satisfied based on a fact that the vehicle speed V reaches the reference value, the low speed stage is selected as the first gear stage of the transmission 12, and the high speed stage is selected as the second gear stage of the transmission 12. In this case, if the output power of the engine 1 is restricted and hence the second gear stage is established to launch the vehicle Ve, a required drive force may not be achieved in the second gear stage. In a case that such disadvantage is expected to be caused, the control system executes a routine shown in FIG. 6.

Figure 6:
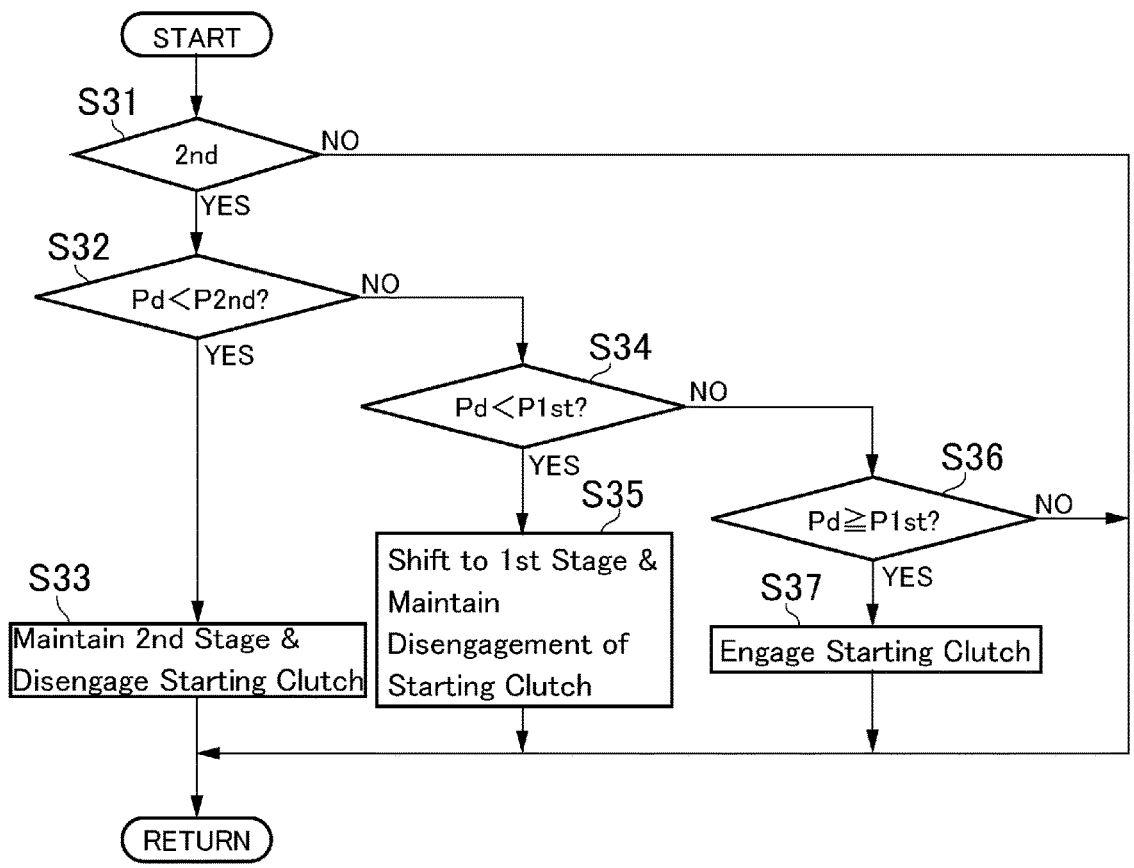
FIG. 6 is a flowchart showing one example of a routine for selecting the gear stage and engaging a starting clutch in accordance with a required drive force.

The routine shown in FIG. 6 is executed in a condition where the vehicle Ve is activated. At step S31, it is determined whether the second gear stage (i.e., the high speed stage) is established in the transmission 12. If the answer of step S31 is NO, the routine returns without carrying out any specific control. By contrast, if the answer of step S31 is YES, the routine progresses to step S32 to determine whether a required drive force Pd is smaller than an upper limit force P2nd possible to be generated by operating the motor 2 as a prime mover while establishing the second gear stage in the transmission 12. For example, the required drive force Pd may be determined based on the accelerator opening Acc while with reference to a map for determined a required drive force. On the other hand, the upper limit force P2nd may be obtained based on a maximum output torque of the motor 2, a speed ratio of the transmission 12, a diameter of the front wheel 11 and so on.

In a case that the answer of step S32 is YES, the required drive force Pd can be achieved by operating the motor 2 as a prime mover while establishing the second gear stage in the transmission 12. In this case, therefore, the routine progresses to step S33 to maintain the gear stage of the transmission 12 to the second gear stage, and to disengage the starting clutch 5 to interrupt torque transmission between the engine 1 and the automatic transmission 6 or the rear wheels 9. Thereafter, the routine returns.

By contrast, if the answer of step S32 is NO, the routine progresses to step S34 to determine whether the required drive force Pd can be achieved by the motor 2 while establishing the first gear stage (i.e., the low speed stage) in the transmission 12. Specifically, it is determined whether the required drive force Pd is smaller than an upper limit force P1st possible to be generated by operating the motor 2 as a prime mover while establishing the first gear stage in the transmission 12. If the answer of step S34 is YES, the routine progresses to step S35 to shift the gear stage of the transmission 12 from the second gear stage to the first gear stage, and to maintain disengagement of the starting clutch 5. Thereafter, the routine returns. In this case, therefore, the speed ratio of the transmission 12 is increased so that the drive force of the front wheels 11 is increased. Consequently, the required drive force Pd can be achieved to propel the vehicle Ve. In this case, the shifting operation of the transmission 12 is executed by changing an engagement state of the dog clutch 17 from a state of establishing the second gear stage to a state of establishing the first gear stage via a disengagement state in which a torque transmission is interrupted. In this case, therefore, torque transmission from the motor 2 to the front wheels 11 is temporarily interrupted and hence the drive force may drop temporarily.

By contrast, if the answer of step S34 is NO, the routine progresses to step S36 to determine whether the required drive force Pd is equal to or greater than the upper limit force P1st possible to be generated by operating the motor 2 as a prime mover while establishing the first gear stage in the transmission 12. If the answer of step S36 is YES, the routine progresses to step S37 to engage the starting clutch 5 thereby connecting the engine 1 to the rear wheels 9. In this case, therefore, an output torque of the engine 1 can be delivered at least partially to the rear wheels 9 even if the output power of the engine 1 is restricted during the warm-up. Consequently, the vehicle Ve is propelled by the drive forces of both of pairs of the front wheels 11 and the rear wheels 9. That is, the vehicle Ve is allowed to be propelled while achieving the required drive force Pd without causing a shortage of the drive force. In this situation, if the engine 1 is being stopped, the engine 1 is to be activated. By contrast, if the answer of step S36 is NO, the routine returns without carrying out any specific control.

Figure 7:
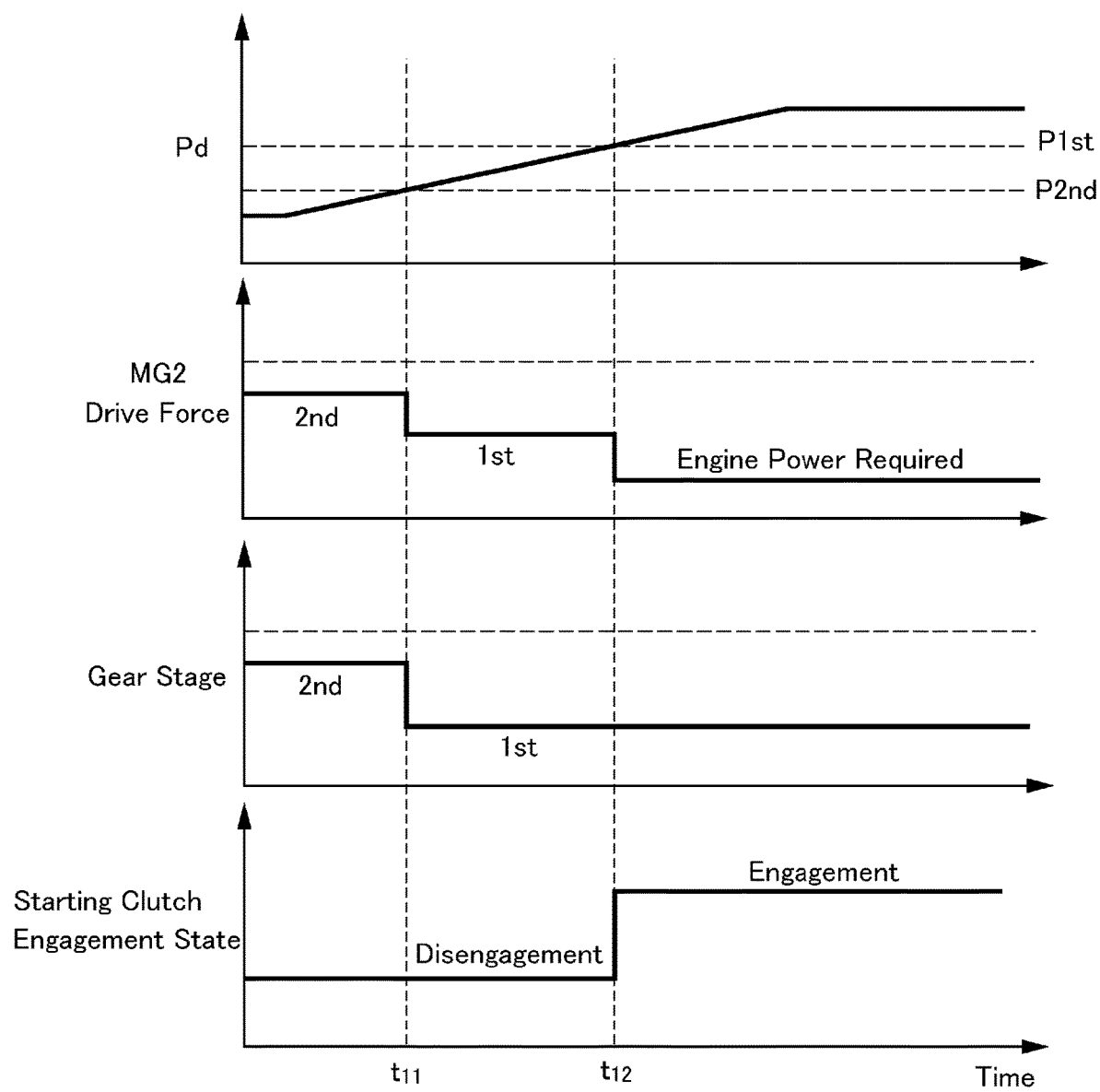
FIG. 7 is a time chart showing temporal changes in a required drive force, a drive force of a motor, a gear stage, and an engagement state of the starting clutch during execution of the routine shown in FIG. 6.

Temporal changes in the required drive force Pd, the drive force of the motor 2, the gear stage, and an engagement state of the starting clutch during execution of the routine shown in FIG. 6 are shown in FIG. 7. For example, in the case that the engine water temperature Twe is lower than the threshold level α, the vehicle Ve is propelled by operating the motor 2 as a prime mover while establishing the second gear stage in the transmission 12. In this situation, the starting clutch 5 is disengaged so that the engine 1 is disconnected from the rear wheels 9. When the accelerator pedal (not shown) is depressed at point t11 so that the required drive force Pd exceeds the upper limit force P2nd of the motor 2 in the second gear stage, the control system determines that the required drive force Pd cannot be achieved in the second gear stage. Consequently, a shifting operation of the transmission 12 is executed to shift the gear stage from the second gear stage to the first gear stage while maintaining disengagement of the starting clutch 5. In this situation, the engine 1 may not only be operated to warm-up itself, but also be stopped.

When the required drive force Pd is further increased and exceeds the upper limit force P1st of the motor 2 in the first gear stage at point t12, the required drive force Pd may be no longer achieved by the motor 2. Consequently, the control system determines that the engine 1 is necessary to achieve the required drive force Pd, and engages the starting clutch 5. In this situation, if the engine 1 has been started, the torque of the engine 1 will be delivered to the rear wheels 9 to generate the drive force so that the required drive force Pd is achieved.

According to the exemplary embodiment, if the required drive force has to be achieved preferentially although it is preferable to propel the vehicle Ve by the motor 2 while maintaining the output power of the engine 1 to a constant power, an output power of the engine 1 may be increased while connecting the engine 1 to the rear wheels 9. For example, if the warm-up of the engine 1 or the catalytic converter 3 has not yet been completed during propulsion while increasing an output power of the engine 1, it is preferable to switch the operating mode to the mode in which the vehicle Ve is powered by the motor 2 while shifting the gear stage of the transmission 12 from the first gear stage to the second gear stage when the required drive force Pd is reduced. As described, torque transmission through the transmission 12 is temporarily interrupted during execution of the shifting operation, therefore, the control system is further configured to execute the following control.

Figure 8:
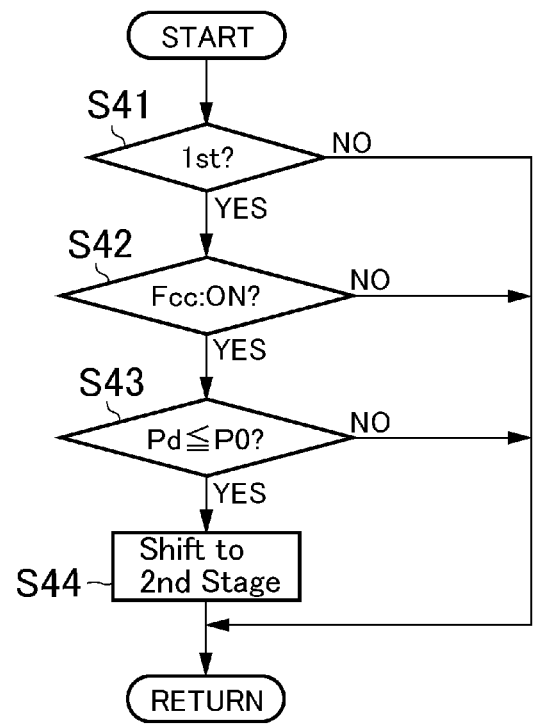
FIG. 8 is a flowchart showing one example of a routine executed when a required drive force is reduced during propulsion of the vehicle.

Turning to FIG. 8, there is shown one example of a routine to be executed when it is preferable to propel the vehicle Ve by the motor 2, for example, before the warm-up of the engine 1 has been completed. At step S41, it is determined whether the first gear stage is established in the transmission 12 during propulsion. If the answer of step S41 is NO, the routine returns without carrying out any specific control. In this case, the gear stage of the transmission 12 is maintained to the second gear stage.

By contrast, if the answer of step S41 is YES, the routine progresses to step S42 to determine whether the catalyst warm-up flag Fcc is still turned on. Instead, at step S42, it is also possible To determine whether the engine water temperature Twe is lower than the threshold level α, or whether the series HV flag Fhv is turned on. If the answer of step S42 is NO, the routine returns without carrying out any specific control because the torque to propel the vehicle Ve can be assisted by the engine 1 during the shifting operation of the transmission 12.

By contrast, if the answer of step S42 is YES, the routine progresses to step S43 to determine whether the required drive force Pd is equal to or smaller than a reference force P0. Specifically, the reference force P0 is set to zero to be achieved by completely returning the accelerator pedal or substantially zero, based on a result of an experimentation or simulation. If the answer of step S43 is NO, the routine returns without carrying out any specific control. Consequently, an execution of the shifting operation in the transmission 12 is inhibited. By contrast, if the answer of step S43 is YES, the routine progresses to step S44 to shift the gear stage of the transmission 12 from the first gear stage to the second gear stage. That is, the shifting operation of the transmission 12 is executed, and thereafter, the routine returns.

Figure 9:
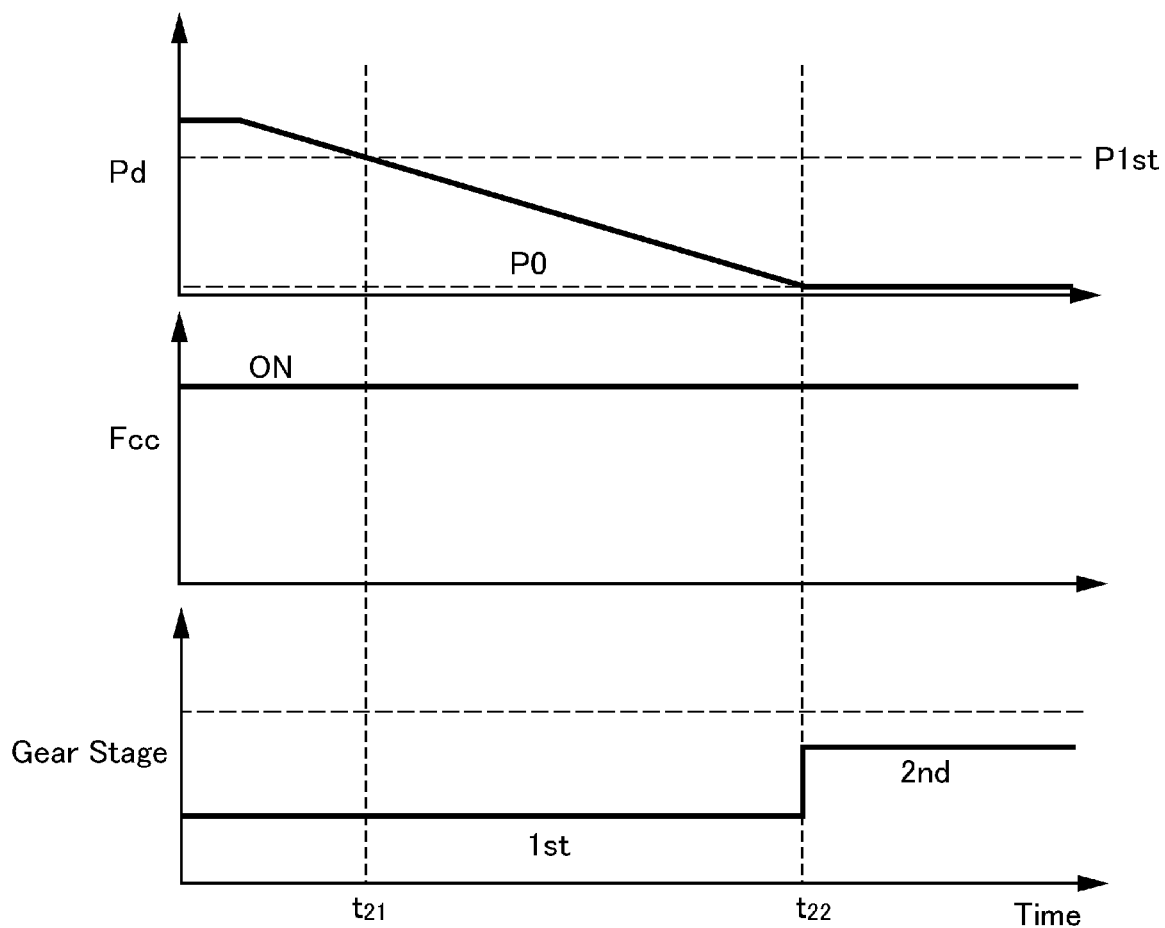
FIG. 9 is a time chart showing temporal changes in a required drive force, a warming flag of a catalyst, and a gear stage of the transmission during execution of the routine shown in FIG. 8.

Temporal changes in the required drive force Pd, the catalyst warm-up flag Fcc, and the gear stage of the transmission 12 during execution of the routine shown in FIG. 8 are shown in FIG. 9. Before point t21, warm-up of the engine 1 has not yet been completed, but the required drive force Pd is greater than the predetermined value (e.g., greater than the upper limit force P1st of the motor 2 in the first gear stage). In this situation, the first gear stage is established in the transmission 12, and the engine 1 is connected to the rear wheels 9 so as to achieve the required drive force Pd. When the accelerator pedal is returned at point t21, the required drive force Pd is reduced smaller than the upper limit force P1st. In this situation, the required drive force Pd may also be achieved by shifting the gear stage of the transmission 12 to the second gear stage. However, since the required drive force Pd is still greater than the reference force P0 at this point, the shifting operation of the transmission to the second gear stage is not executed.

When the required drive force Pd is further reduced to or less than the reference force P0 at point t22, the shifting operation of the transmission to the second gear stage is executed. In this situation, the dog clutch 17 is temporarily disengaged and hence the torque transmission from the motor 2 to the front wheels 11 is temporarily interrupted. However, at point t22, the accelerator pedal is returned so that the required drive force Pd is reduced to substantially zero, and the vehicle Ve is propelled by the small drive force or inertial force. In this situation, therefore, a change in the drive force will not change behavior and acceleration of the vehicle Ve even if the drive force is temporarily reduced to zero. For this reason, shocks will not be generated. Especially, in a case of setting the reference force P0 to a positive value in accordance with the current vehicle speed V, the shifting operation of the transmission 12 will be caused in a situation where an engine braking force is substantially zero. In this case, therefore, a temporal loss of the engine braking force will not be caused.

According to the exemplary embodiment of the present disclosure, in the parked vehicle Ve in which the engine 1 is stopped, the front wheels 11 may be halted by the torque applied from the motor 2. If the shifting operation of the transmission 12 is executed in this situation, a drive force of the vehicle Ve is changed by the temporal disengagement of the dog clutch 17, and shocks may be generated. In order to reduce the shocks in this situation, the control system is further configured to execute the routine shown in FIG. 10.

Figure 10:
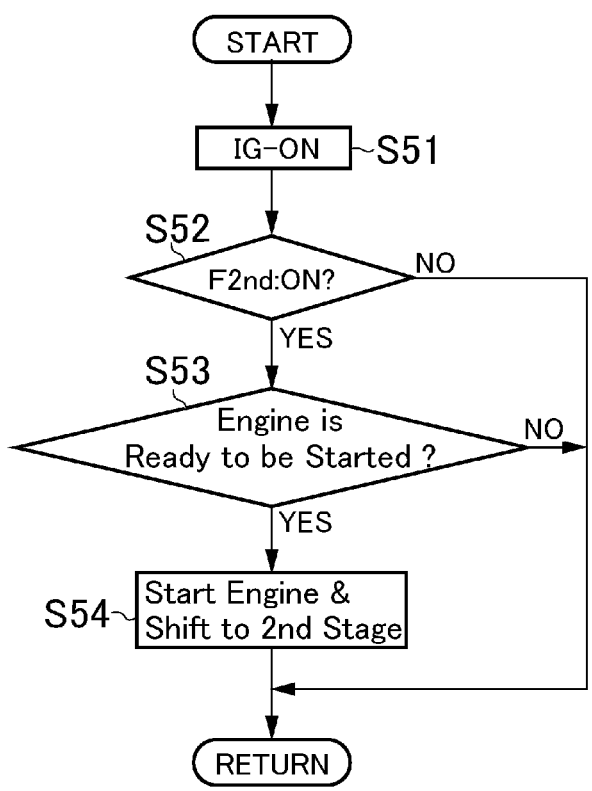
FIG. 10 is a flowchart showing one example of a routine for executing a shifting operation of the transmission simultaneously with starting the engine.

The routine shown in FIG. 10 is executed during parking of the vehicle Ve. At step S51, the starting switch is turned on so that the starting signal (IG-ON) is transmitted. Then, it is determined at step S52 whether a command flag F2nd for establishing the second gear stage in the transmission 12 is turned on. As described, in the case that the output power of the engine 1 is maintained to a constant power e.g., to warm-up the engine 1, the vehicle Ve is launched in the second gear stage thereby avoiding an execution of shifting operation in the transmission 12 during propulsion by the motor 2. For this purpose, at step S52, it is determined whether the vehicle Ve is in condition to be propelled by the motor 2. If the answer of step S52 is NO, the routine returns without carrying out any specific control. In this case, the first gear stage is established in the transmission 12 and maintained.

By contrast, if the answer of step S52 is YES, the routine progresses to step S53 to determine whether the engine 1 is ready to be started. For example, at step S53, it is determined whether the warm-up of the engine 1 or the catalytic converter 3 is necessary. If the answer of step S53 is YES, the routine progresses to step S54 to start the engine 1 and to shift the gear stage to the second gear stage simultaneously.

Figure 11:
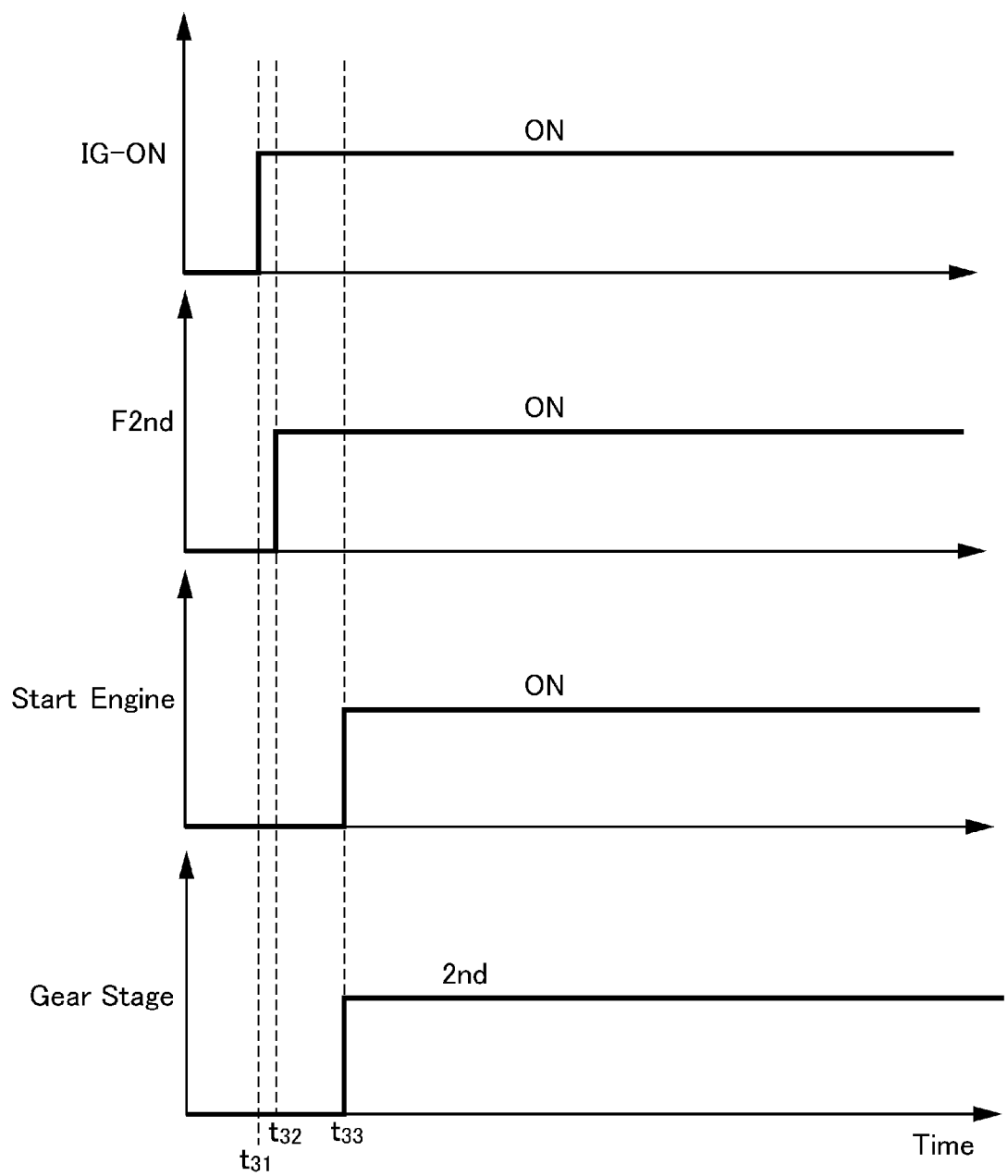
FIG. 11 is a time chart showing temporal changes in the flags and the gear stage during execution of the routine shown in FIG. 10.

Temporal changes in the flags and the gear stage of the transmission 12 during execution of the routine shown in FIG. 10 are shown in FIG. 11. Before point t31, the vehicle Ve is parked while stopping the engine 1. At point t31, the starting signal IG-ON is transmitted, but the warm-up of the engine 1 or the catalytic converter 3 has not yet been completed at point t32. Therefore, the command flag F2nd is turned on at point t32. In this situation, since the warm-up of the engine 1 or the catalytic converter 3 has not yet been completed, a command signal to startup the engine 1 is transmitted at point t33, and a shifting operation of the transmission 12 from the first gear stage to the second gear stage is executed simultaneously.

As described, the engine 1 is started by cranking the engine 1 by the generator 4 being operated as a motor while disengaging the starting clutch 5 or bringing the automatic transmission 6 into the neutral stage. Otherwise, the engine 1 may also be cranked by a starter motor (not shown). In this situation, therefore, vibrations may be generated by a rotation or combustion of the engine 1. At the same time, the shifting operation of the transmission 12 is executed and the drive force of the front wheels 11 is changed due to temporal interruption of torque transmission of the dog clutch 17. However, such change in the drive force resulting from the shifting operation of the transmission 12 is caused simultaneously with the generation of shocks resulting from starting the engine 1. For this reason, a driver or passengers may be prevented from feeling shocks generated by shifting the gear stage of the transmission 12 from the first gear stage to the second gear stage.

Although the above exemplary embodiments of the present disclosure have been described, it will be understood by those skilled in the art that the present disclosure should not be limited to the described exemplary embodiments, and various changes and modifications can be made within the scope of the present disclosure. For example, the control system according to the exemplary embodiment may also be applied to a two-wheel drive layout vehicle in which a predetermined pair of wheels is driven by the engine and the motor, instead of the four-wheel drive layout vehicle. The control system according to the exemplary embodiment may also be applied to a vehicle in which a driving motor is employed as the second prime mover instead of the engine. In addition, the automatic transmission 6 may be omitted. In a case of arranging a geared automatic transmission in the vehicle, torque transmission between the engine and the drive wheels may be interrupted by bringing the automatic transmission into the neutral stage. In this case, therefore, the aforementioned clutch may be omitted.

In the routine shown in FIG. 10, the startup of the engine and the shifting operation of the transmission are executed simultaneously. However, the shifting operation of the transmission may also be executed when connecting the engine which has already been started to the drive wheels through the clutch.

What is claimed is:

1. A control system for a vehicle comprising:
    a transmission that can establish at least a first gear stage and a second gear stage;
    a first prime mover that applies torque to drive wheels through the transmission; and
    a second prime mover that applies torque to the drive wheels or another drive wheels,
    wherein the transmission includes a dog clutch that is engaged when establishing the first gear stage and when establishing the second gear stage to transmit the torque through the transmission, and that is disengaged temporarily thereby interrupting torque transmission through the transmission when shifting between the first gear stage and the second gear stage,
    the control system comprising:
    a controller that controls the transmission,
    wherein the controller is configured to
    determine that an increase in drive force of the drive wheels or said another drive wheels by the torque of the second prime mover is restricted,
    establish the first gear stage in the transmission to launch the vehicle in a case that an increase in the drive force by the second prime mover is not restricted when launching the vehicle, and shift to the second gear stage upon satisfaction of a predetermined condition during propulsion of the vehicle while increasing the drive force from the drive force of when launching the vehicle, and
    establish the second gear stage in the transmission to launch the vehicle in a case that an increase in the drive force by the second prime mover is restricted when launching the vehicle.

2. The control system for the vehicle as claimed in claim 1,
    wherein the first prime mover includes an electric motor, the second prime mover includes an internal combustion engine, and
    the vehicle includes a hybrid vehicle, in which an operating mode is selected from a first mode for propelling the vehicle by a torque of the electric motor, and a second mode for propelling the vehicle by a torque of the internal combustion engine.

3. The control system for the vehicle as claimed in claim 1,
    wherein a clutch is disposed between the second prime mover and the drive wheels or said another drive wheels to selectively interrupt torque transmission therebetween, and
    the controller is further configured to determine that an increase in drive force of the drive wheels or said another drive wheels by the torque of the second prime mover is restricted upon satisfaction of a condition to propel the vehicle while disengaging the clutch to interrupt torque transmission through the clutch.

4. The control system for the vehicle as claimed in claim 2,
    wherein a clutch is disposed between the second prime mover and the drive wheels or said another drive wheels to selectively interrupt torque transmission therebetween, and
    the controller is further configured to determine that an increase in drive force of the drive wheels or said another drive wheels by the torque of the second prime mover is restricted upon satisfaction of a condition to propel the vehicle while disengaging the clutch to interrupt torque transmission through the clutch.

5. The control system for the vehicle as claimed in claim 4, wherein the condition to propel the vehicle while disengaging the clutch includes a condition to propel the vehicle in the first mode.

6. The control system for the vehicle as claimed in claim 2,
    wherein the internal combustion engine includes an exhaust gas purifying catalyst, and
    the controller is further configured to determine that an increase in drive force of the drive wheels or said another drive wheels by the torque of the second prime mover is restricted upon satisfaction of a condition to warm-up the exhaust gas purifying catalyst.

7. The control system for the hybrid vehicle as claimed in claim 1, wherein the predetermined condition includes a fact that at least any one of a vehicle speed and a required drive force to propel the vehicle exceeds a reference value.

8. The control system for the hybrid vehicle as claimed in claim 1,
    wherein the drive wheels are front wheels,
    said another drive wheels are rear wheels,
    the second prime mover applies the torque to the rear wheels,
    a speed ratio of the first gear stage is smaller than a speed ratio of the second gear stage, and
    the predetermined condition includes a condition to propel the vehicle in a four-wheel mode in which the vehicle is propelled by driving both of the front wheels and the rear wheels.

9. The control system for the hybrid vehicle as claimed in claim 2, wherein the controller is further configured to start the internal combustion engine and shift the gear stage of the transmission simultaneously when both of a condition to start the internal combustion engine and a condition to shift the gear stage of the transmission are satisfied.

* * * * *